United States Patent Office 3,239,820
Patented Mar. 8, 1966

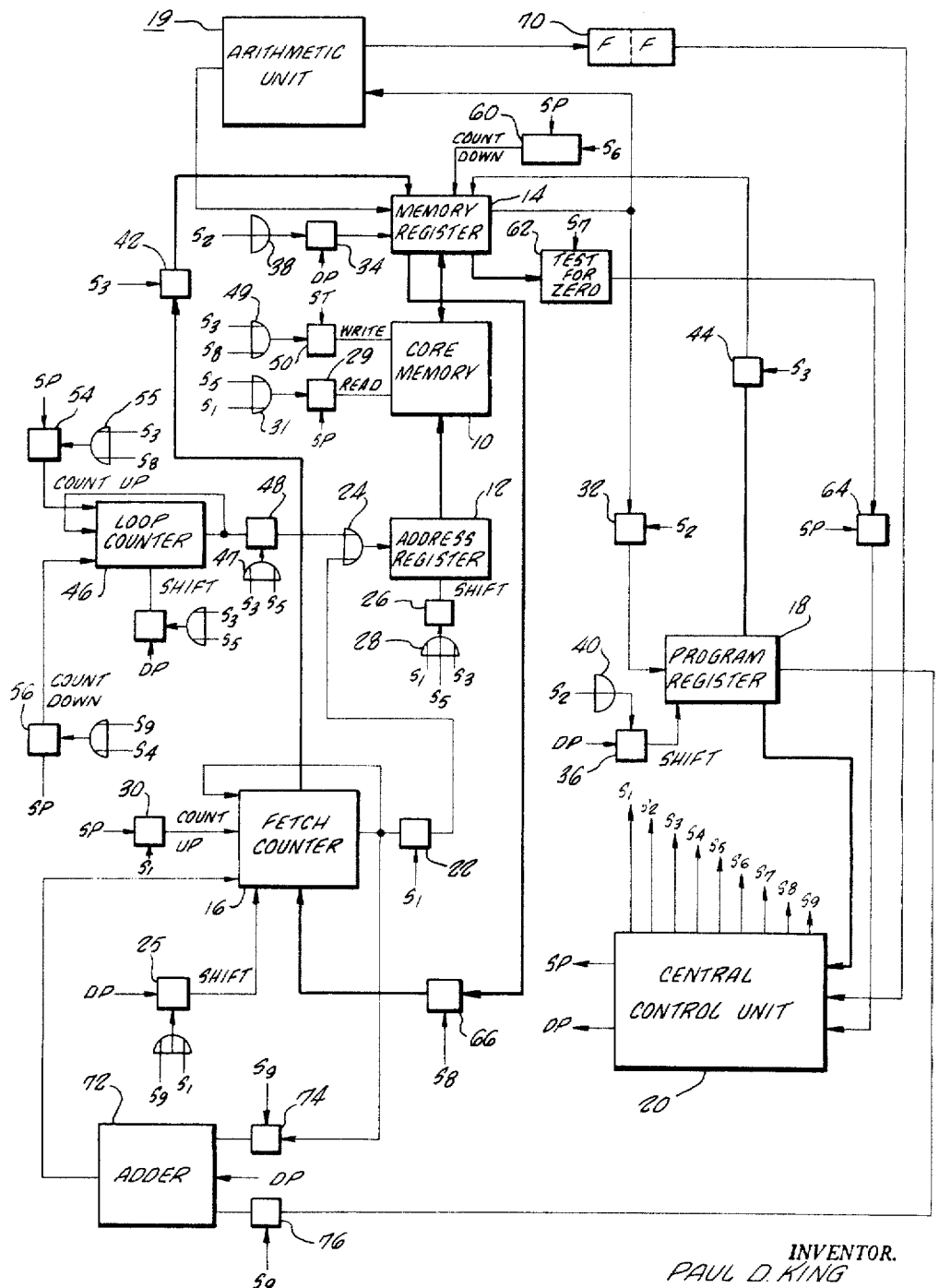

3,239,820
DIGITAL COMPUTER WITH AUTOMATIC
REPEATING OF PROGRAM SEGMENTS
William A. Logan, Covina, and Paul D. King, Pasadena,
Calif., assignors to Burroughs Corporation, Detroit,
Mich., a corporation of Michigan
Filed Feb. 16, 1962, Ser. No. 173,747
6 Claims. (Cl. 340—172.5)

This invention relates to electronic digital processors, and more particularly, is concerned with an internally programmed electronic digital processor arranged to automatically repeat any program segment a specified number of times and to permit repeat segments to be nested within repeat segments of the program.

In internally programmed digital computers it is frequently desirable to repeat a set of instructions a predetermined number of times or until some condition is satisfied. Such an iterative process can be programmed in prior art computers but requires a number of instructions to be executed including a tally and testing operations. Where it is desired to have repeat loops of instructions included or "nested" within another repeat loop, the programming becomes quite complex to provide, among other operations, a tally of a tally. Thus, a complicated and time consuming programming routine is necessary.

In brief, the present invention provides an arrangement in an internally programmed digital computer for automatically repeating a designated group of program instructions any selected number of times, the repeat group being hereinafter referred to as a loop. Moreover, a program loop may include within it another loop. This nesting of loops can be to any depth, making the invention extremely valuable in editing and manipulating data.

The present invention provides for two program operators, one called the Enter-Loop Operator to designate the start of a loop, and one called the End-of-Loop operator to designate the end of the loop. The operator for starting the loop, whenever encountered in the string of program instructions, causes information as to the number of times the loop is to be repeated and the storage address location of the next instruction in the loop to be stored. The End-of-Loop Operator, whenever encountered, causes an automatic determination of the number of times the loop has been repeated. If the loop has not been repeated the designated number of times, the stored address information is used to initiate another pass through the loop again. If the loop has been repeated the designated number of times, the End-of-Loop Operator causes the stored information to be destroyed and the program to continue in sequence.

In adidtion, an operator called a Jump Operator provides for automatic jump out of a loop if the result of a relational test is true. At the same time, the Jump Operator destroys the information stored by the Enter-Loop Operator, so that the particular loop exited will not be re-entered on encountering the next End-of-Loop Operator in the program string.

Reference should be made to the accompanying drawing wherein the single figure is a block diagram of one embodiment of the present invention.

In co-pending Application, Serial No. 84,156, filed January 23, 1961, and issued as Patent No. 3,200,379 in the name of Paul D. King and Robert S. Barton and assigned to the assignee of the present invention, there is described a digital computer which is arranged to operate on a string of digitally coded program control syllables. The program control syllables differ from the conventional instructions used in "single-address" and "multi-address" machines in that separate types of syllables are provided for designating an operation to be performed and for addressing memory to obtain an operand. The two principal types of syllables are referred to as "Operator" syllables for specifying the various arithmetic and logic operations requiring an associated address as in computers using conventional instructions. The program string is normally executed by calling out the syllables in sequence from storage. The present invention provides means by which certain Operator syllables can be used to modify the sequence so that segments of the program string can be repeated any specified number of times.

Referring now to the drawing in detail, the numeral 10 indicates generally a random access memory, such as a magnetic core memory, in which binary coded words are stored in addressable memory locations. The memory locations are selected by binary coded addresses stored in an Address register 12. Binary coded information words are transferred into and out of specified memory locations in the core memory 10 through an input/output Memory register 14. Whether transfer is from a specified memory location to the register 14 or from the register 14 to the specified address location is initiated by a pulse on one or the other of two inputs designated respectively the "Write" input or the "Read" input. Addressable core memories of this type are well known in the computer arts. See, for example the book, "Digital Computer Components and Circuits" by R. K. Richards, J. Van Nostrand Company 1957, chapter 8.

The Program syllables are stored in a portion of the core memory 10 in consecutive memory locations. The syllables are read out of the core memory 10 in the required sequence under the control of a Fetch counter 16. The counter is initially set to a value corresponding to the address location of the first program syllable in memory and then is counted up one each time a Program syllable is transferred out of memory. Since a serial operation is assumed throughout in which words are transferred character by character between registers, the counter 16 is arranged as a shift register. It will be clearly understood that serial operation is given by way of example only and the invention is equally applicable to parallel operation.

Each Program syllable read out of the core memory 10 is transferred from the Memory register 14 to a Program register 18. It is while in the Program register 18 that the syllable is decoded to determine whether it is an Operator syllable or Value Call syllable. Each Program syllable contains bits to designate which type of syllable it is. After a syllable is placed in the Program register 18, these bits are sensed and applied to the central control unit indicated generally at 20.

The function of the central control unit 20 is the same as in any computer, namely to cause all the individaul units of the computer to perform in such a manner that the Program syllables are sensed in the proper sequence and executed. A suitable central control unit is described in detail in copending application Serial No. 788,823, filed January 26, 1959, and issued as Patent No. 3,001,708 in the name of Edward L. Glaser and assigned to the assignee of the present invention. The central control unit is arranged to go through a succession of states in which high levels are applied to designated gates through the computer. For each type of syllable the control unit goes through a different sequence of states. The central control unit 20 is further arranged to generate a predetermined number of digit pulses, designated DP's, while in each state followed by one step pulse, designated SP. The generation of the SP normally causes the central control unit to advance to the next state unless the central control is set to some other state by internal logic circuitry.

The states $S_1$ and $S_2$ of the central control unit, which are common to all syllable executions, are used to control the Fetch operation of the next syllable from the core memory. To this end, the $S_1$ state is applied to a gate 22 on the output of the Fetch counter 16, permitting transfer of the contents of the Fetch counter 16 through a "logical or" circuit 24 into the input of the Address register 12. $S_1$ also opens the gate 25, permitting DP's to be applied to the shift input of the Fetch register 16, the number of DP's generated during the state $S_1$ being sufficient to transfer a complete word from the Fetch counter 16 to the Address register 12. DP's are also applied through a gate 26 to the shift input of the Address register 12 in response to the $S_1$ state applied to the gate 26 through a "logical or" circuit 28. As a result, during state $S_1$ the contents of the Fetch counter 16 are placed in the address register 12. The SP then advances the central control unit 20 to the state $S_2$.

The SP generated at the end of the $S_1$ state is applied to the "Read" input of the core memory 10 by means of a gate 29. The gate 29 is biased open by the $S_1$ level applied through a "logical or" circuit 31. As a result, the contents of the memory location addressed by the Fetch counter are placed in the Memory register 14. The SP is also used to count up to the Fetch counter 16 by applying it to a gate 30 which is open during the $S_1$ state. Thus, the Fetch counter 16 is advanced to the address location of the next Program syllable in the program string stored in the memory. The SP advances the central control unit 20 from $S_1$ to $S_2$.

During the $S_2$ state, a gate 32 is open permitting transfer of information from the Memory register 14 to the Program register 18. DP's are applied to the shift inputs of the two registeds, repsectively, through gates 34 and 36. The high level of $S_2$ is applied to these respective gates through "logical or" circuits 38 and 40, respectively.

If a Value Call syllable has been transferred to the Program register 18, the central control unit functions in the manner described in the above-identified copending application. If an Operator syllable has been transferred to the Program register 18, the central control unit decodes the syllable and controls the processor accordingly. The processor may have a number of Operator syllables such as add, subtract, and the like. In the above-described copending application, the execution of an Add Operator syllable is described in detail.

In the present invention, which is directed to operations in which portions of the string of Program syllables can be repeated, the start of a repeat loop is flagged by an Enter-Loop Operator. This Operator syllable, in addition to including bits which identify it as an Enter-Loop Operator syllable, includes bits which designate the number of times the program segment or loop is to be repeated. The identification bits are applied to a decoder in the central control unit causing the central control unit to advance to the $S_3$ state.

During the $S_3$ state the contents of the Fetch counter 16 are used to set a portion of the Memory register 14 through a gate 42. Thus, the address of the next syllable on the string is placed in the Memory register 14. At the same time, the bits in the Program register 18 identifying the number of times the loop is to be repeated are transferred to the Memory register 14 through a gate 44 in preparation for storage of this information in the memory 10. An address is derived from a Loop counter 46 which is arranged to be either counted up or counted down or operated as a shift register. During the $S_3$ state, as applied to a "logical or" circuit 47 and a "logical or" circuit 51, the Loop counter is coupled to the Address register 12 through a gate 48 by means of shifting pulses applied through a gate 52. The SP generated during the $S_3$ state is applied to the Write input of the core memory 10 through a "logical or" circuit 49 and a gate 50. At the same time the Loop counter is counted up one by applying the same SP through a gate 54, controlled by applying the $S_3$ state through a "logical or" circuit 55, to the Count Up input of the Loop counter 46.

This completes the operation of the Enter Loop Operator and the central cotrol unit 20 is returned to the $S_1$ state to fetch the next syllable in the program string. Thus, it will be recognized that the sole function of the Start Loop operator is to store information as to the start address of the Loop and to store information as to the number of times the Loop is to be repeated. After encountering the Enter Loop Operator, the computer continues in normal operation fetching and executing the syllables of the program string in sequence by means of the Fetch counter 16.

The group of syllables forming the portion of the program in the loop is terminated by an End-of-Loop Operator. When this operator is placed in the Program register 18, bits in the syllable are decoded by the central control unit 20. The bits which identify the syllable as an End-of-Loop operator cause the central control unit 20 to advance from the $S_2$ state to the $S_4$ state. At the end of the $S_4$ state, the Loop counter 46 is counted down one by applying an SP through a gate 56.

The central control unit then advances to the $S_5$ state during which time the contents of the Loop counter 46 are transferred to the Address register 12. To this end the $S_5$ state is applied to the gate 26 to permit DP's to shift the Address register 12 and the $S_5$ state is also applied to the gate 52 to shift the Loop conuter 46. Also, the $S_5$ state is applied to the gate 48 to couple the output of the Loop counter 46 to the input of the Address register 12. At the end of the $S_5$ state, the SP is applied to the gate 29 to cause the core memory 10 to transfer the addressed information to the Memory register 14. This information will be the address and number of times the loop is to be repeated that was stored during the previous Enter-Loop Operator. The central control unit then advances to the state $S_6$.

During the $S_6$ state the information in the Memory reigster 14 identifying the number of loops is reduced by one. To this end, the $S_6$ state is applied to a gate 60 which passes an SP pulse to the portion of the Memory register 14 storing the information as to the number of loop repeats. This portion of the Memory register 14 is arranged as a counter which can be counted down by input pulses. With the number of repeats reduced by one, this information now identifies the fact that one pass of the loop has already been completed. Central control unit 20 is then advanced to the $S_7$ state.

A decoder 62 is coupled to the Memory register 14 for testing whether or not the repeat number has been reduced to zero. If the decoder 62, during the $S_7$ state, indicates that the repeat number is zero, it opens a gate 64, passing an SP to the central control unit 20 and causing the central control unit 20 to return to the $S_1$ state. In this event, the next syllable in sequence in the program string is fetched by the Fetch counter and executed; no repeat of the loop is provided.

However, if the test for zero indicates that the repeat number is not zero, no pulse is passed by the gate 64, and the control unit 20 automatically advances to the $S_8$ state. During the $S_8$ state, the Address information stored in the Memory register 14 is transferred to the Fetch counter 16 through a gate 66. At the end of the $S_8$ state, the contents of the Memory register 14 are returned to the core memory 10. To this end, the $S_8$ state is applied to the gate 50 to cause the SP at the end of the $S_8$ state to transfer the contents of the Memory register 14 back again to the same location in the core memory 10. At the same time the Loop counter 46 is counted up one by applying the $S_8$ state to the gate 54.

With the Fetch counter 16 now loaded with the address of the first syllable in the Loop, the central control unit automatically returns from the $S_8$ state to the $S_1$ state to fetch the first syllable in the loop being repeated. Thus, it will be recognized that the Enter Loop operator and the End-of-Loop Operator combine to cause a group of syllables in the program string to be repeated any specified number. After the loop has been repeated the required number of times, the processor continues on executing additional syllables in the program string in sequence.

It will be recognized that nesting of loops one inside the other is made possible by the operation of the Loop counter 46. For example, if one loop is to be nested inside of another loop, an Enter-Loop Operator will be encountered for the main loop and later an Enter-Loop Operator will be encountered for the nested sub-loop. The Loop counter 46 is thus advanced twice. When the first End-of-Loop Operator is encountered, it will automatically go back to the last return point information entered in the core memory 10, as designated by the condition of the Loop counter 46. Once the sub-loop is repeated the required number of times, the program string is continued until the second End-of-Loop Operator is encountered. The condition of the Loop counter 46 automatically addresses the return point information for the main loop at this point. As the program string advances through the main loop the second time, the sub-loop will be again encountered and will be again repeated the designated number of times during the second pass through the main loop. Thus, the nested sub-loop is repeated a designated number of times each time the main loop is repeated.

It may be desirable at some point in a loop to jump forward out of a lower order loop into the next higher order loop or jump outside the highest order loop. To this end, a Conditional Jump operator is provided. The Conditional Jump syllable is preceded in the program string by one or more syllables which make some test to establish whether or not the condition is met for the Conditional Jump Operation. The test may be of any type such as used heretofore in testing for conditional branch operations such as encountered in conventional computers. For example, a comparison may be made between two operands in the arithmetic unit 19 to determine if one is equal to or greater or less than another, a test may be made to determine whether an operand is positive or negative. Whatever test is made in the arithmetic unit 19, a true-false flip-flop 70 is set by the arithmetic unit 19. The manner in which flip-flop 70 may be set to one condition or another in response to a test executed by the computer can be accomplished in any manner well-known in the prior art and no further description is believed essential for the purpose of the present disclosure.

If a Conditional Jump Operator is encountered in the Program register 18, bits identifying the operator are decoded in the central control unit 20. The condition of the flip-flop 70 is also applied to the central control unit 20 and if the flip-flop 70 is in its proper state to indicate that the condition for a jump out of loop has been met by the program test, the central control unit 29 establishes the $S_9$ state. During the $S_9$ state, the contents of the Fetch counter 16 are modified by adding a group of bits in the Conditional Jump Operator in the Program register 18 to provide a new value in the Fetch counter 16 corresponding to the desired address. To this end, the output of the Fetch counter 16 is applied to an adder 72 through a gate 74 while the output of the Program register 18 is applied to the adder 72 through a gate 76. Shifting pulses are applied to the Fetch counter 16 through the gate 25 while shift pulses are applied to the Program register 18 through the gate 36. The output of the adder 72 is returned to the Fetch counter 16. The Loop counter is counted down by one by the SP at the end of the $S_9$ state.

From the above description, it will be recognized that the present invention provides apparatus by means of which any portion of a program string in a computer can be repeated automatically a designated number of times. Furthermore, the arrangement of the present invention permits any number of repeat loops to be nested within repeat loops, the computer automatically keeping track of the return point for each of the nested loops. Also, the computer can be arranged to jump out of any loop whenever some specified condition is satisfied.

What is claimed is:

1. A digital processor in which any segment of the program can be automatically repated a designated number of times comprising an addressable storage facility for storing a plurality of digitally coded words in addressable storage locations, a first counter, control means for controlling the processor in response to digitally coded program words when any of said words are transferred to the control means, means including the first counter for addressing the storage facility by the contents of the first counter and transferring a program word to the control means from the corresponding address location in the storage facility, means for advancing the counter by one as each program word is transferred to the control means, whereby the program words are addressed in predetermined sequence, a second counter, means responsive to the control means when a first particular program word is transferred thereto for addressing the storage facility by the contents of the second counter and transferring the contents of the first counter and a portion of said first particular program word in the control means to a corresponding address location in the storage facility, said portion of the first particular program word designating the number of times a program segment is to be repeated and the contents of the first counter designating the starting address of the program segment to be repeated, means responsive to the control means when a second particular program word is transferred thereto for addressing the storage facility by the contents of the first counter and transferring a portion of the contents of the corresponding storage location to the first counter, whereby the first counter is reset to the stored address of the start of the program segment, means responsive to the control means when said second particular program word is transferred thereto for counting down the repeat information portion in the addressed word in storage by one, and means for sensing when the stored repeat information is counted down to zero, said last-named means on sensing a zero operating to reduce the second counter by one and interrupt the reloading of the first counter so that further repeating of the program segment is interrupted and the program sequence resumed.

2. A digital processor in which any segment of the program can be automatically repeated a designated number of times comprising an addressable storage facility for storing a plurality of digitally coded words in addressable storage locations, a first counter, control means for controlling the processor in response to digitally coded program words when any of said words are transferred to the control means, means including the first counter for addressing the storage facility by the contents of the first counter and transferring a program word to the control means from the corresponding address location in the storage facility, means for advancing the counter by one as each program word is transferred to the control means, whereby the program words are addressed in predetermined sequence, a second counter, means responsive to the control means when a first particular program word is transferred thereto for addressing the storage facility by the contents of the first counter and transferring the contents of the first counter and a portion of said first particular program word in the control means to a corresponding address location in the storage facility, said portion of the first particular program word designating the number of times a program segment is to be repeated and the contents of the first counter designating the starting address of the program segment to be repeated, means responsive to the control means when a second particular program word is transferred thereto for addressing the storage facility by the contents of the second counter and transferring a portion of the contents of the corresponding storage location to the first counter whereby the first counter is reset to the stored address of the start of the program segment, means responsive to the control means when said second particular program word is transferred thereto for counting the number of times said program segment is repeated, means responsive to said last-named means for sensing when the stored repeat information is the same as the number of times said program segment has been repeated, and means responsive to said sensing means for interrupting the reloading of the first counter so that further repeating of the program segment is interrupted and the program sequence resumed.

3. A digital processor in which any segment of the program can be automatically repeated a designated number of times comprising an addressable storage facility for storing a plurality of digitally coded words in addressable storage locations, a first counter, control means for controlling the processor in response to digitally coded program words when any of said words are transferred to the control means, means including the first counter for addressing the storage facility by the contents of the first counter and transferring a program word to the control means from the corresponding address locations in the storage facility, means for advancing the counter by one as each program word is transferred to the control means, whereby the program words are addressed in predetermined sequence, a second counter, means responsive to the control means when a first particular program word is transferred thereto for addressing the storage facility by the contents of the second counter and transferring the contents of the first counter and a portion of said first particular program word in the control means to a corresponding address location in the storage facility, said portion of the first particular program word designating the number of times a program segment is to be repeated and the contents of the first counter designating the starting address of the program segment to be repeated, and means responsive to the control means when a second particular program word is transferred thereto for addressing the storage facility by the contents of the second counter and transferring a portion of the contents of the corresponding storage location to the first counter, whereby the first counter is reset to stored address to the start of the program segment.

4. A digital processor comprising addressable storage means for storing a plurality of digitally coded program words, control means for controlling operation of the processor, a first counter, means responsive to the first counter for transferring one word at a time from sequential address locations in the storage means to the control means, temporary storage means arranged to store a plurality of digitally coded words and to make the words available for readout in the reverse order in which the words are read into the temporary storage, means responsive to the control means when a first particular coded word is transferred thereto for transferring the contents of the first counter to the temporary storage means, means responsive to the control means when a second particular coded word is transferred thereto for loading the first counter from temporary storage, whereby the first counter is reset to repeat the sequence of program words, and means for eliminating the address from temporary storage when said second particular word has been readdressed a predetermined number of times and for permitting the first counter to continue to address the program words in sequence after said second word is encountered said predetermined number of times.

5. In a digital computer in which a stored program of groups of digits are sensed a group at a time in sequence for controlling the operation of the computer, apparatus comprising means responsive to the sensing of a first particular group of digits in the program sequence for storing information identifying the next group of digits in the program sequence, means responsive to the sensing of a second particular group of digits in the program sequence for automatically repeating the previously sensed groups in the same sequence starting with the group of digits identified by said information stored by said means sensing said first particular group of digits, means for counting the number of times the sequence is repeated, and means responsive to the counting means for interrupting the automatic repeat operation when the counting means reaches a count corresponding to a value specified by a portion of the second particular group of digits.

6. In a digital processor in which a stored program of individually addressable digital groups are normally sensed in sequence and used to control the operation of the processor, apparatus comprising means including a counter for addressing and sensing the program groups in a predetermined sequence, temporary storage means arranged to automatically store and readout information stored therein in the reverse sequence in which the information is written into the storage means, means responsive to the sensing of a first identifiable group of digits in the program for automatically transferring the address of the next group in the sequence from the counter to the temporary storage means whenever said first identifiable group of digits is encountered, and means responsive to the sensing of a second identifiable group of digits resetting the counter from the temporary storage means for repeating the addressing and sensing of the sequence of the stored program groups starting with the group whose address corresponds to the last address placed in the temporary storage.

References Cited by the Examiner
UNITED STATES PATENTS

| 2,914,248 | 11/1959 | Ross | 235—157 |
| 2,959,351 | 11/1960 | Hamilton | 235—153 |
| 3,012,726 | 12/1961 | Williams | 235—157 |

ROBERT C. BAILEY, *Primary Examiner.*

MALCOLM A. MORRISON, *Examiner.*